US007683251B2

(12) United States Patent
Weir

(10) Patent No.: US 7,683,251 B2
(45) Date of Patent: *Mar. 23, 2010

(54) METHOD AND APPARATUS FOR PLAYING IN SYNCHRONISM WITH A DIGITAL AUDIO FILE AN AUTOMATED MUSICAL INSTRUMENT

(75) Inventor: Andrew P. Weir, Malvern, PA (US)

(73) Assignee: QRS Music Technologies, Inc., Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/624,517

(22) Filed: Jan. 18, 2007

(65) Prior Publication Data

US 2007/0113728 A1 May 24, 2007

Related U.S. Application Data

(63) Continuation-in-part of application No. 11/469,813, filed on Sep. 1, 2006.

(60) Provisional application No. 60/713,936, filed on Sep. 2, 2005.

(51) Int. Cl.

| | |
|---|---|
| ***A63H 5/00*** | (2006.01) |
| ***G10H 1/36*** | (2006.01) |
| ***G10H 7/00*** | (2006.01) |
| ***G09B 5/00*** | (2006.01) |
| ***G06F 17/00*** | (2006.01) |

(52) U.S. Cl. ............................ 84/610; 84/609; 84/645; 434/307 A; 700/94

(58) Field of Classification Search .................. 84/609, 84/610, 645; 434/307 A; 700/94
See application file for complete search history.

(56) References Cited

U.S. PATENT DOCUMENTS

| | | | | |
|---|---|---|---|---|
| 4,744,281 | A * | 5/1988 | Isozaki | 84/602 |
| 5,062,097 | A | 10/1991 | Kumaoka | |
| 5,138,925 | A | 8/1992 | Koguchi | |
| 5,148,419 | A | 9/1992 | Koguchi | |
| 5,189,237 | A | 2/1993 | Koguchi | |
| 5,300,725 | A | 4/1994 | Manabe | |
| 5,313,011 | A | 5/1994 | Koguchi | |
| 5,397,853 | A * | 3/1995 | Koguchi | 434/307 A |
| 5,602,356 | A * | 2/1997 | Mohrbacher | 84/609 |
| 6,600,097 | B2 | 7/2003 | Shiiya | |
| 6,737,571 | B2 | 5/2004 | Furukawa | |
| 2002/0092411 | A1 | 7/2002 | Shiiya | |
| 2003/0177890 | A1 * | 9/2003 | Furukawa | 84/610 |

* cited by examiner

*Primary Examiner*—Jeffrey Donels
*Assistant Examiner*—Andrew R Millikin
(74) *Attorney, Agent, or Firm*—Barnes & Thornburg LLP; Glenn W. Ohlson

(57) ABSTRACT

The invention disclosed is a system for playing a music sequence such as a MIDI file in synchronization with a pre-recorded digital audio data file, such as an MP3 file. The synchronization is accomplished by using the digital media sample rate as a common time base for progression of the playing of the digital media and the music sequence.

19 Claims, 2 Drawing Sheets

METHOD AND APPARATUS FOR PLAYING IN SYNCHRONISM WITH A DIGITAL AUDIO FILE AN AUTOMATED MUSICAL INSTRUMENT

RELATED APPLICATIONS

This application claims priority to and is a CIP of U.S. Non-Provisional application Ser. No. 11/469,813 entitled A METHOD AND APPARATUS FOR PLAYING IN SYNCHRONISM WITH A CD AN AUTOMATED MUSICAL INSTRUMENT and filed on Sep. 1, 2006 which claims priority to U.S. Provisional Application 60/713,936 entitled METHOD AND SYSTEM THAT ISSUES TIME-STAMPED MUSICAL ARTICULATION EVENTS TO A MUSICAL INSTRUMENT filed on Sep. 2, 2005. This application also claims priority to U.S. Non-Provisional application Ser. No. 11/469,797 entitled METHOD AND APPARATUS FOR PLAYING IN SYNCHRONISM WITH A DVD AN AUTOMATED MUSICAL INSTRUMENT filed on Sep. 1, 2006 which also claims priority to U.S. Provisional 60/713,936. All of the above applications are incorporated herein by reference.

FIELD OF THE INVENTION

This invention relates to the area of automated musical instruments, particularly pianos, the invention also relates to the method of creating or authoring music sequences files for use with the automated musical instrument.

BACKGROUND OF THE INVENTION

Automated musical instruments, such as pianos, are well known in the art. Such instruments are typically acoustic instruments that use mechanical actuators to operate the instrument. The actuators receive commands of articulation events or music sequences to control or play the instrument. The music sequences are delivered to the instrument by a controller. There have been a number of attempts to have an automated instrument play in synchronization or accompaniment with a prerecorded CD or hard drive. Such attempts are described in U.S. Pat. Nos. 5,138,925, 5,300,725, 5,148,419 and 5,313,011. In order allow for synchronous play, those previous attempts rely upon timing information presented on a sub-channel of the CD to provide a common time frame for both the music sequences and the CD audio to reference. While such an arrangement is sufficient, it suffers from the limited resolution offered by the timing information of the CD sub-channel. The timing information of the CD sub-channel has a period or resolution of 13 milliseconds, which is not accurate enough for some piano sequences. The present invention described herein uses the timing inherent in the CD audio data as the time reference. By the use of this technique, the timing can have a period or resolution of 22.7 microseconds based upon the sample rate of 44.1 kHz of the digital audio data of the CD. One will recognize that this technique can be applied to any digital audio data, not just data on a CD. For instance, the technique may be applied to MP3, WAV or other popular digital media files.

While listening to the automated instrument playing alone is entertaining for the user, some users desire to have the instrument play along with a commercial recording of a musical selection, thus allowing the user to experience the recorded selection accompanied by a live automated instrument.

In some early products for playing an automated piano in synchronism with a CD, the CD media contained music sequences that were pre-synchronized to a digital accompaniment music track encoded as linear PCM. For instance, the audio music track would be encoded as PCM on the left channel of the CD, and the music sequence, encoded as MIDI, would be encoded on the right channel. In the invention described herein, the system utilizes off the shelf commercially recorded CD, or other digital audio data such as MP3 files, and music sequences specifically authored to play in synchronism with the musical selections on the media. The music sequences are generally MIDI files stored on removable media such as SD cards and the like. One skilled in the art will recognize that there are many ways to deliver the music sequences, such as MIDI files, to the consumer and ultimately to the controller of the automated musical instrument, and SD cards are but one example. Likewise, the MP3 or other digital audio data can be stored in any number of media, including optical discs, hard drives, SD cards, Compact Flash cards or any other media suitable for storing digital data.

SUMMARY OF THE INVENTION

The system described herein includes a controller for delivering the music sequences to the automated musical instrument. The controller is also in communication with a drive or other device or software capable of playing or rendering digital media such as a CD, MP3 files, or other digital audio data. The controller, using the digital audio data as a time reference, delivers the music sequences to the automated musical instrument so that the instrument plays in synchronism with the selection playing from the digital audio data. One skilled in the art will recognize that the controller could also host and act as the player for the music sequence with the appropriate software. Hence, the controller can host and act as the player for both the digital audio data and the music sequence.

The following terms and definitions are used in this specification. The definitions included herein are to add meaning to terms and are not meant to limit or otherwise supplant meanings that are understood by those skilled in the art.

MIDI—Acronym for Musical Instrument Digital Interface. MIDI is a music industry standard for digitally communicating musical instrument articulation events as a sequence of one or more bytes per event. The standard includes mechanical, electrical and byte signaling specifications.

MIDI Interface—A physical interface across which MIDI bytes are sent and/or received.

MIDI Event—A byte sequence that encodes a single musical instrument articulation event such as 'key on' or 'sustain pedal depressed.'

MIDI Sequence—A chronological sequence of time-stamped MIDI events that encapsulates a performance of one or more musical instruments.

MIDI Sequencer—A device that plays a MIDI Sequence in real time for the purpose of reproducing a musical performance.

Standard MIDI File (SMF)—A music industry standard for storing and retrieving MIDI Sequences to and from a digital data file commonly referred to as MIDI file.

Pianomation—A system for translating MIDI events to electro-mechanical activity for the purpose of automating an acoustic piano, or other automated musical instrument.

Controller—An electronic device used to drive Pianomation with music sequences, such as MIDI Events from various media.

DVD—Acronym for the consumer electronics Digital Video Disc standard and media.

CD Player—A device, such as an optical drive, that is capable of playing a CD.

CD Player Subsystem—An electronic Subsystem used to play CDs such as an integrated CD player ASIC and related electronic components contained within a larger system such as a Controller.

Music Sequence—A term used in this application to generically refer to a chronological sequence of time-stamped digital musical instrument articulation events that encapsulates a performance of one or more musical instruments. This could be a SMF, a MIDI Sequence, or an otherwise encoded sequence that achieves the same objective.

Sync-Along CD—The technique described herein for synchronizing a music sequence to a CD Player or CD Player Subsystem.

Sync-Along CD Device—The device that implements the technique. This device can either attach to or be contained within a controller.

Compressed Audio—A sequence of audio data samples that is compressed, typically using frequency-domain coefficient quantization/elimination and some form of entropy coding. This compression is typically implemented to reduce a system's audio storage and/or audio delivery bandwidth requirements.

MP3—Audio data that is compressed according to the MPEG-1 Layer-3 standard. Sometimes, MP3 is also assumed to include MPEG-2 Layer-3 and MPEG-2.5 Layer-3.

AC3—Dolby Labs audio data compression, used mostly on DVDs.

Bit Rate (or Bitrate)—The rate at which compressed audio data is delivered. This rate can be constant or variable. It is typically measured over a compressed audio 'frame' which is some number of audio samples.

Sample Rate—The rate at which uncompressed digital audio samples are issued. The sample rate for a file, song, or performance is constant.

PCM—Acronym for Pulse Code Modulation. This term refers to the linear digital encoding of instantaneous audio amplitude at a constant sample rate. This is also referred to as uncompressed digital audio.

In the present invention, the controller, through use of a digital audio data player incorporated into the controller, acts as both the MIDI Sequencer and the digital audio playback device, so the controller has inherent and immediate knowledge of what digital audio track or selection is being played and what that track's time progress is. Typically, these digital audio data files will contain musical performances and information identifying the musical selection such as artists, album, song length, and title. The object is to drive the automated musical instrument synchronously along with the musical selection or song of the digital audio file.

The pre-authored music sequences are synchronized to the digital audio stream of the digital audio data per track or per selection. This means that a particular track or musical selection is extracted from the digital audio medium by the authoring system. Once this is done, it is played by the authoring system which is simultaneously capturing a live piano performance along with it and converting that performance to a music sequence, typically in MIDI format. The time stamps for the music sequence use the extracted digital audio data or stream as its source of time reference rather than some other system time. Hence, the resulting music sequence is synchronized to the digital audio track on any playback system as long as the playback system uses the digital audio data stream as its time reference.

Once the music sequence is authored or pre-authored as the process is alternatively named, it is associated with the musical selection in some way. Since the Sync-Along device or controller is always the renderer of the digital audio data, it has specific knowledge of the selected track or selection that is being played, such as the title, artists, song length and Volume ID, and is always aware of exactly what track or selection is being played. As such, the specific information such as title and artist are stored as either Meta Events within the MIDI Sequence, or as part of the filename of the MIDI Sequence, allowing the controller to recognize what music sequence matches the song or selection being played. One skilled in the art will recognize other identifying information can be used to match the MIDI file to the musical selection.

Therefore, when a controller is instructed by the user to playback a particular selection, the system loads the requested music sequence along with its identifying information and checks to make sure that that particular song's digital audio data file is loaded for playback.

Playback of digital audio data is implemented by the controller by reading the digital audio data, directly off of the storage media such as a CD or SD card and sending that data to its DAC Subsystem for rendering to an analog signal. If the file is compressed, such as an MP3 file, the file is uncompressed prior to or during playback. Generally, the file is decompressed as the data is read and the resulting linear or PCM data is buffered locally for playback. The DAC Subsystem itself is regulated by the audio rate of the DAC, which will nominally run at 44.1 kHz—or preferably the audio sample rate of the digital audio data. Hence, the data itself is consumed at the sample data rate by the DAC Subsystem which, via its DMA progress status, then provides the controller with an accurate digital audio time-base.

Once playback of the audio track has been initiated, the controller resets its internal sequencer time-base and monitors the progression of uncompressed linear audio time as measured by the DAC Subsystem. As this digital linear audio time progresses, the controller submits the MIDI events to the Piano system in accordance with the event timestamps. Thus, the digital audio data and the automated musical instrument are synchronized.

Since the automated Piano is a solenoid-actuated system, there is a measurable time delay from the time it receives a MIDI Event and the time it can actually sound a note on the automated acoustic Piano. In practice, his time can be as low as 100 ms or as high as 500 ms. Although the time is variable, the controller fixes the absolute delay from event reception to note sounding at 500 ms. Because of this delay, the controller advances the assertion of MIDI events during playback by 500 ms relative to the song start in order to maintain absolute synchronization to the song as perceived by the user.

DETAILED DESCRIPTION OF THE PREFERRED EMBODIMENT

Figure 1:
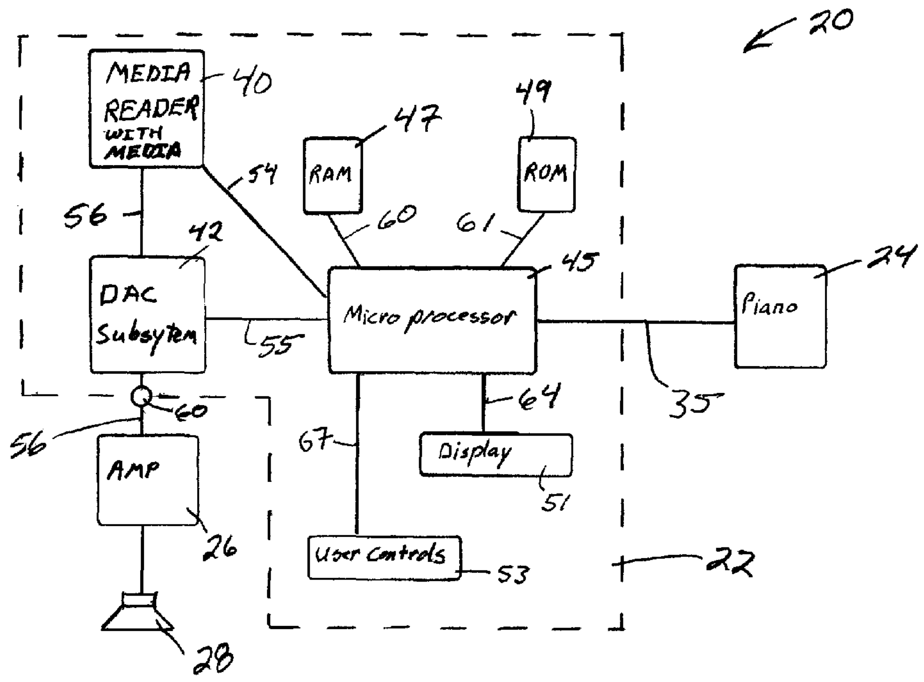
FIG. 1 is a block diagram showing the operational components of the system of the invention.
Figure 2:
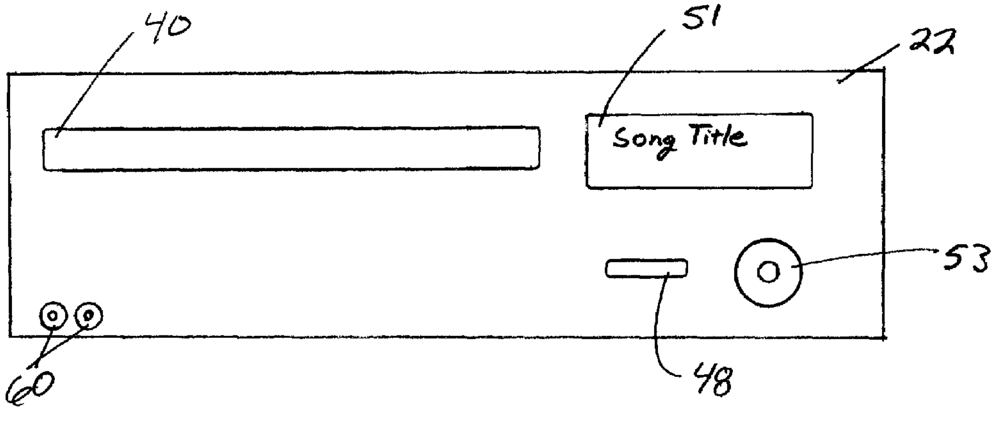
FIG. 2 is a front view of a controller.
Figure 3:
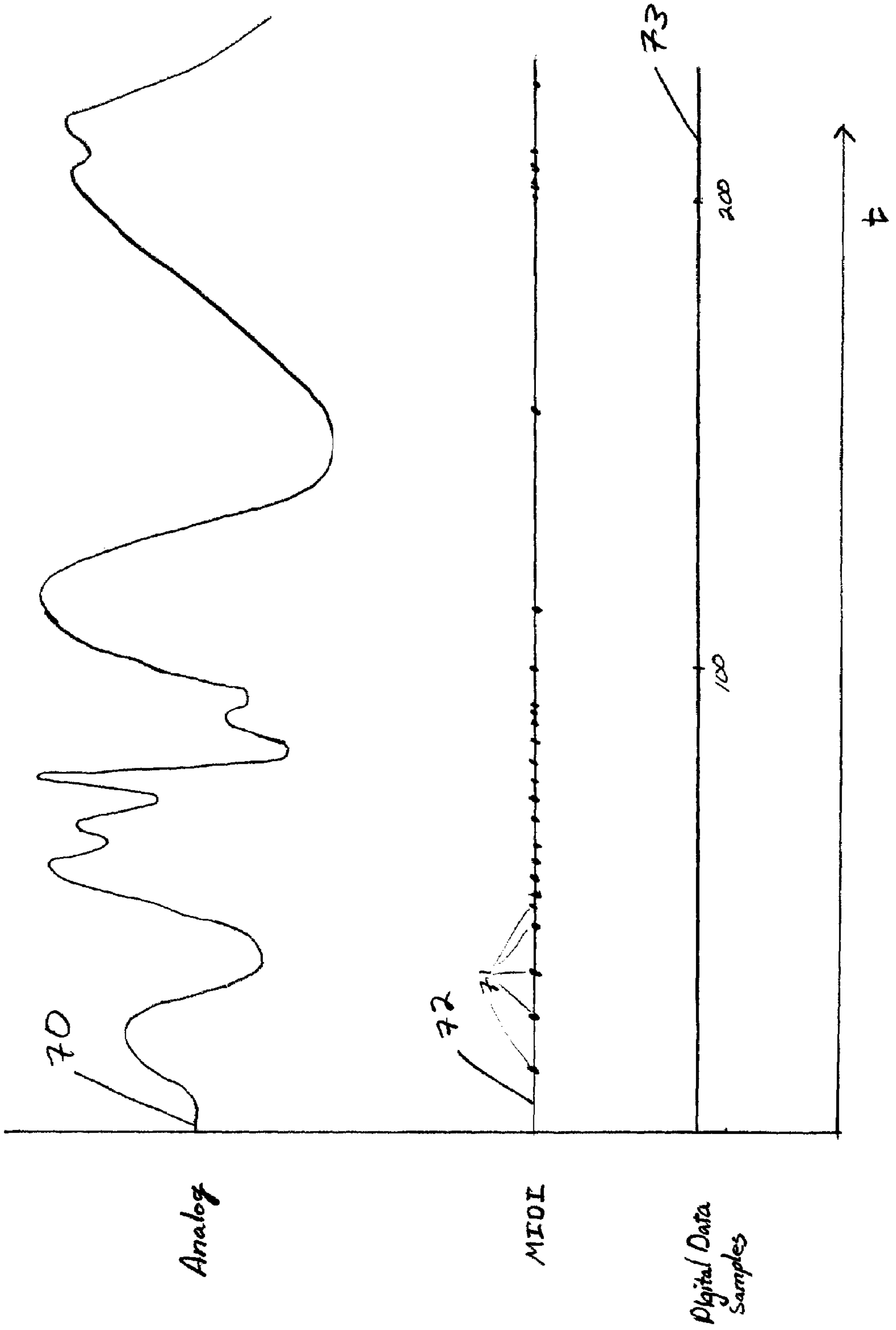
FIG. 3 is a diagram showing the timing relationship between an analog audio output, a music sequence or series of articulation events, and the digital data stream or data samples.

As shown in FIG. 1, the synchronization system 20 described herein includes a controller 22, an automated musical instrument, such as a piano 24, and an amplifier 26 and speaker 28. The amplifier 26 and speaker 28 can be incorporated into the controller 22 in an alternate embodiment, and need not be separate devices. Similarly, the amplifier 26 and speaker 28 can be replaced with any combination of devices that will allow the user to hear the recorded material on the digital audio file, such as an MP3 file placed into the media reader 40 of the controller 22. Thus, it is beneficial for the housing of the controller 22 to include an audio output port for connection of the amplifier 26 and speaker 28, or other device used to transduce the audio signal output from the controller 22. In the preferred embodiment, the output port is a pair of RCA jacks 60 to allow play of the left and right audio channels of the musical selection of the digital audio file, as shown in FIG. 2.

The controller 22 is connected to the automated musical instrument or piano 24 by a communication channel 35 capable of carrying the music sequences from the controller 22 to the piano 24. In the preferred embodiment, the communication channel is a high speed UART serial channel.

The controller 22 includes a media reader 40, a digital to analog converter (DAC) subsystem 42, a microprocessor 45, random access memory (RAM) 47, read only memory (ROM) 49 such as flash memory or an SD card or other removable media, a display 51, and user controls 53.

The media reader 40 can be any device capable of reading the data such as an MP3 file stored on the digital media holding the song or selection and outputting the digital music data and non-music data regarding the song or selection stored in the digital audio file. The media reader 40 shares a communications channel 54 with the microprocessor 45 to convey information regarding the song to the microprocessor 45, and to receive control commands from the microprocessor 45. The media reader 40 also may share a communications channel 56 with the DAC subsystem 42, although such a channel is not necessary in all implementations. The communications channel 56 serves to send the digital audio data from the media reader directly to the DAC subsystem 42, without going through the microprocessor 45. One will recognize that an internal storage device, such as a hard drive, can also perform the function of the media reader, and serve as the digital media as well.

The DAC subsystem 42 of the preferred embodiment processes the digital audio data and converts the digital information into an analog signal. In the preferred embodiment, the DAC subsystem has two main parts, one of which may be incorporated into the microprocessor 45. The first part is a DMA controller. The DMA controller moves audio data from the processor's RAM 47 to the DAC without processor intervention, as one skilled in the art will recognize. In the preferred embodiment, the DMA controller is built into the TriMedia microprocessor. The DAC subsystem 42 also includes a digital to analog converter. In the preferred embodiment, the digital to analog converter is model CS4226 manufactured by Cirrus Logic. The DAC subsystem communicates with the microprocessor 45 by communications channel 55. The communications channel is used to send information to the microprocessor 45, access RAM 47 in communication with the microprocessor 45, and to receive control commands from the microprocessor 45. Among the information shared with the microprocessor 45 is the DMA progress status, or information regarding how many units of the digital audio data have been processed or output by the DAC subsystem 42. The DAC subsystem 42 outputs the analog signal to the amplifier 26 by communications channel 56. Communication channel 56 may include an output port 60 in the housing of the controller 22. In the preferred embodiment, the output port is a pair of RCA jacks.

The microprocessor 45 is in communication with RAM 47 by communication channel 60. In the preferred embodiment, the controller 22 has 1 gigabyte of RAM, although other amounts can be used. The microprocessor 45 is also in communication with ROM 49 by communications channel 61. The ROM 45 is used to provide the music sequences, preferably MIDI files, to the controller 45. In the preferred embodiment, the ROM 49 is an SD card. The controller 22 is provided with a slot or interface 48 that will accept the SD card and link the card to the communications channel 61. On skilled in the art will recognize that other types of memory could be used for ROM 49, provided the controller 22 has the appropriate interface and the microprocessor 45 has the corresponding inputs and software to accommodate the type of memory used. It is also possible that the digital audio data and the MIDI files can be on the same media, such as an SD card. In such an embodiment the media reader 40 could be used to provide the interface between the microprocessor and the MIDI files as well.

In the preferred embodiment, the microprocessor is a TriMedia manufactured by Philips. Other microprocessors can be used to accomplish the tasks described herein. For example, the microprocessor should be able to feed data to the DAC subsystem, monitor the data progress, and interface with the musical instrument to provide the instrument with the articulation events.

The controller 22 includes a display 51 in communication with the microprocessor by communication channel 64. The display is preferably an alpha numeric display capable of displaying information regarding the selection of digital audio file being played, as well as the music sequences available in ROM 49. In the preferred embodiment the display 51 is a multi character fluorescent display. Other displays may be used to convey information to the user.

The controller also includes user controls 53 in communication with the micro processor 45 by communication channel 67. In the preferred embodiment, the user control 53 includes a knob that can be rotated to scroll through the available selections, and pressed to select the displayed selection, which determines the music sequence the controller 22 will play. One skilled in the art will recognize that the user controls 53 can be any type of device that allows the user to interact with the controller 22. For instance the user controls 53 could be a push button, keyboard, or touch screen. In the preferred embodiment, the display shows the titles of the music sequences available for play by the controller. The number of titles displayed at any one time depends upon the size of the display used. The user manipulates user controls 53 to change the titles displayed until the desired title is displayed and selected for play.

The titles are obtained from the files stored in ROM 49. In the preferred embodiment, the ROM 49 contains music sequences such as MIDI files or corresponding to a particular set of songs, such as a commercial CD or album. The individual music sequences generally correspond to the tracks present on the commercial CD or album. The volume ID for the CD or other indicia identifying the set of songs or musical selections, and the track number are preferably stored as meta events in the music sequence. Alternately, the Volume ID and track number can form part of the file name for the music sequence file. The ROM 49 may also include a file to associate the song titles of the music sequence with the volume ID and track numbers or other indicia of the CD or album. Thus, the controller 22 has access to indicia such as song titles and can display the song titles on the display 51 corresponding to the music sequences available in ROM 49.

The music sequences are authored to the set of songs using standard authoring software such as a Digital Performer sold by Motu. During the authoring process, which is familiar to those skilled in the art, the music sequence is stored in a file as articulation or MIDI events. The timing or reference of the articulation events is based upon the audio rate or sample rate of the digital audio. FIG. 2 shows the relationship between an analog audio signal 70, such as the audio output of the DAC subsystem, and the articulation events 71 of a corresponding music sequence 72, as well as to the time base of the digital data 73. The time base is referenced to the sample rate of the digital data 73. One skilled in the art will recognize that the analog signal 70 is created from the conversion of the digital audio data which can have various sample rates or bit rates, and that the authoring software relates the meta events to the timing of the digital audio data with reference to the sample time being played. Thus, when the digital audio data is played in the microprocessor 45 can access the DAC subsystem 42 to determine how many samples have passed since the beginning of play to obtain an accurate time base. Having that information, the microprocessor 45 can send the articulation event to the piano 24 at the correct time.

In the preferred embodiment, the piano 24 is a solenoid actuated system, and as such has an inherent delay between the time it receives a meta event and the sounding of the note on the piano 24. In order to account for this delay, the microprocessor 45 sends the meta event to the piano 24 at a discrete time in advance of the timestamp of the meta event. In the preferred embodiment, the discrete time is 500 ms. Thus, the microprocessor 45 sends the midi event to the piano 500 ms earlier than called for by the timestamp associated with the event in order to achieve playing of the piano 24 in absolute synchronization with the selection being played from the digital audio file.

In operation, the system 20 generally operates as outlined herein. One skilled in the art will recognize that the operation may vary depending upon the particular embodiment. The user selects a ROM device, such as an SD card, containing the music sequence files authored for a particular set of songs, such as a commercial CD or album. The user inserts the ROM device into the slot or interface 48 on the face of the controller 22, allowing the microprocessor 45 to access the files on the ROM device. The user also places the media holding the desired digital audio data into the media reader 40. The microprocessor accesses the files on the ROM 49 and displays the titles of music selections available on the display 51. The titles are displayed one at a time. In order to advance to the next available title, the user manipulates a user control 53, which in the preferred embodiment is a rotatable knob. Rotation of the knob scrolls through the available music selections.

When the desired music selection appears on the display 51, the user manipulates a user control 53 to start play, which in this embodiment involves pressing the knob. One skilled in the art will recognize that other types of controls or interfaces can be used. In response, the microprocessor 45 accesses ROM 49 and loads the selected music sequence along with its indicia such as album and title and in to RAM 47. The microprocessor 45 then quires the digital audio data available to the media reader 40 to determine if the title selection is available. If the title is not available, the microprocessor displays on the display 51 indicia such as "song not available" or other instructions to the user to indicate that the digital audio data is available does not match the ROM device selected. If the title selected is available, match, play of the audio data can begin.

To play the digital audio data, the microprocessor 45 resets an internal time sequencer and sends the digital audio data to the DAC subsystem 42. The DAC subsystem 42 converts the digital audio data to an analog signal, which is then output to an amplifier 26 for play on speaker 28. The DAC also provides the microprocessor 45 with the time progress of the digital audio data processed by sending the microprocessor 45 timing information from the DAC subsystem's 42 DMA progress status. Monitoring this information, the microprocessor 45 knows what time it is relative to the start of the playing of the audio data. The microprocessor advances this time by a discrete amount, preferably 500 ms and tracks the time in its internal time sequencer. As the time in the internal time sequencer progresses, the microprocessor issues meta events to the piano 24 via communications channel 35, thus allowing play of the piano in absolute synchronization with the audio data being played.

The embodiments described herein are mere examples of the teachings of the invention. As such, they are not intended to limit the scope of the claimed invention.

I claim:

1. An apparatus for playing an automated musical instrument in synchronism with a digital audio file, the apparatus including:

a source for a music sequence including time stamped articulation events;

a source for a digital audio file;

a controller in communication with the source for a music sequence and the source for a digital audio file and in communication with the automated musical instrument, the controller providing the articulation events to the automated musical instrument in accordance with the time stamped articulation of events, the controller further including a digital to analog converter subsystem that receives the digital audio file as an input to directly convert the digital audio file to an analog signal for play, the digital to analog converter subsystem providing the controller with a progress status of the time since the beginning of the play of the analog signal, the controller using the progress status of time as a time base for resetting the time stamped articulation events to ensure synchronism with the automated musical instrument.

2. The apparatus of claim 1, where the music sequence is a MIDI file.

3. The apparatus of claim 2, where the digital media is selected from the group of compact flash cards, or SD cards.

4. The apparatus of claim 1, where the source of a music sequence is digital media.

5. The apparatus of claim 1, where the digital audio file is an MP3 file.

6. The apparatus of claim 1, where the source of a music sequence and the source for a digital audio file are the same media.

7. The apparatus of claim 6, where in the media is selected from the group including: optical disc, digital audio tape, SD cards, hard drives, and compact flash cards.

8. The apparatus of claim 1, wherein the microprocessor sends the events in music sequence to the automated musical instrument at a discrete time prior to the time called for by the time stamp for the event.

9. The apparatus of claim 8, wherein the discrete time is between 100 msec and 500 msec.

10. A controller for playing an automated musical instrument in synchronism with a digital audio file, including, a media reader;

a DAC subsystem;

a microprocessor;

memory storing a music sequence;

the media reader in communication with the microprocessor and the DAC subsystem, the media reader providing the DAC subsystem with digital audio data, and providing the microprocessor with information regarding identity of the audio track;

the DAC subsystem including a digital to analog converter that receives the digital audio data as an input and is adapted to directly convert the digital audio data into an analog signal for transmission to a transducer;

the DAC subsystem in communication with the microprocessor and providing the microprocessor with monitoring information regarding the time progress of processing the digital audio data;

the microprocessor in communication with the memory storing a music sequence, the microprocessor sending the music sequence to the automated musical instrument based on the time progress of processing the digital audio data in accordance with the monitoring information provided to the microprocessor.

11. The apparatus of claim 10, wherein the music sequence is a MIDI file including time stamped articulation events.

12. The apparatus of claim 10, wherein the microprocessor sends the events in music sequence to the automated musical instrument at a discrete time prior to the time called for by the time stamp for the event.

13. The apparatus of claim 12, wherein the discrete time is between 100 msec and 500 msec.

14. A method of playing in synchronism digital audio data and an automated musical instrument, the method including the steps of:

providing a music sequence having time stamped articulation events;

providing digital audio data as input to a digital to analog converter;

converting the digital audio data into an analog signal by the digital to analog converter and sending the analog signal to a transducer to convert the signal into an audible signal;

monitoring the progression of the conversion of the digital audio data to establish a time base;

referencing the time base and sending the articulation events to the automated musical instrument in accordance with the monitoring and the time stamps as the time base progresses so that the music sequence and automated musical instrument are synchronized; and wherein the digital audio data includes a first indicia identifying the digital audio data, and the music sequence includes a second indicia identifying the music sequence, the method including the further step of comparing the first indicia to second indicia and determining if the indicia match.

15. The method of claim 14, wherein the articulation events are advanced a discrete period of time.

16. The method of claim 15, wherein the discrete period of time is between 100 msec to 500 msec.

17. The method of claim 14, where the digital audio data is on a CD, the digital audio data having a sampling rate of 44.1 kHz.

18. The method of claim 14, including the step of selecting the music sequence from a plurality of music sequences, reading the first indicia of the selected music sequence, and selecting for conversion into an analog signal, the digital audio data having matching second indicia.

19. The method of claim 14, where the music sequence is authored to accompany the digital music data.

* * * * *